United States Patent [19]

Pennella

[11] 3,903,190

[45] Sept. 2, 1975

[54] ACYCLIC OLEFIN ISOMERIZATION IN NITROGEN ATMOSPHERE USING COBALT HYDRIDE COMPLEXES

[75] Inventor: Filippo Pennella, Bartlesville, Okla.

[73] Assignee: Phillips Petroleum Company, Bartlesville, Okla.

[22] Filed: Nov. 19, 1973

[21] Appl. No.: 416,806

[52] U.S. Cl. .............................................. 260/683.2
[51] Int. Cl. ................................................ C07c 3/62
[58] Field of Search .................................. 260/683.2

[56] References Cited
UNITED STATES PATENTS 3,692,852  9/1972  Tabler.............................. 260/683.2
3,721,718  3/1973  Hughes et al................... 260/683.2

*Primary Examiner*—Veronica O'Keefe
*Attorney, Agent, or Firm*—Neuman, Williams, Anderson & Olson

[57] ABSTRACT

Cobalt hydride complexes containing tertiary phosphine, arsine or stibine ligands are employed as catalysts for isomerization of olefins. Enhanced catalytic activity is achieved by use of nitrogen in the isomerization.

7 Claims, 1 Drawing Figure

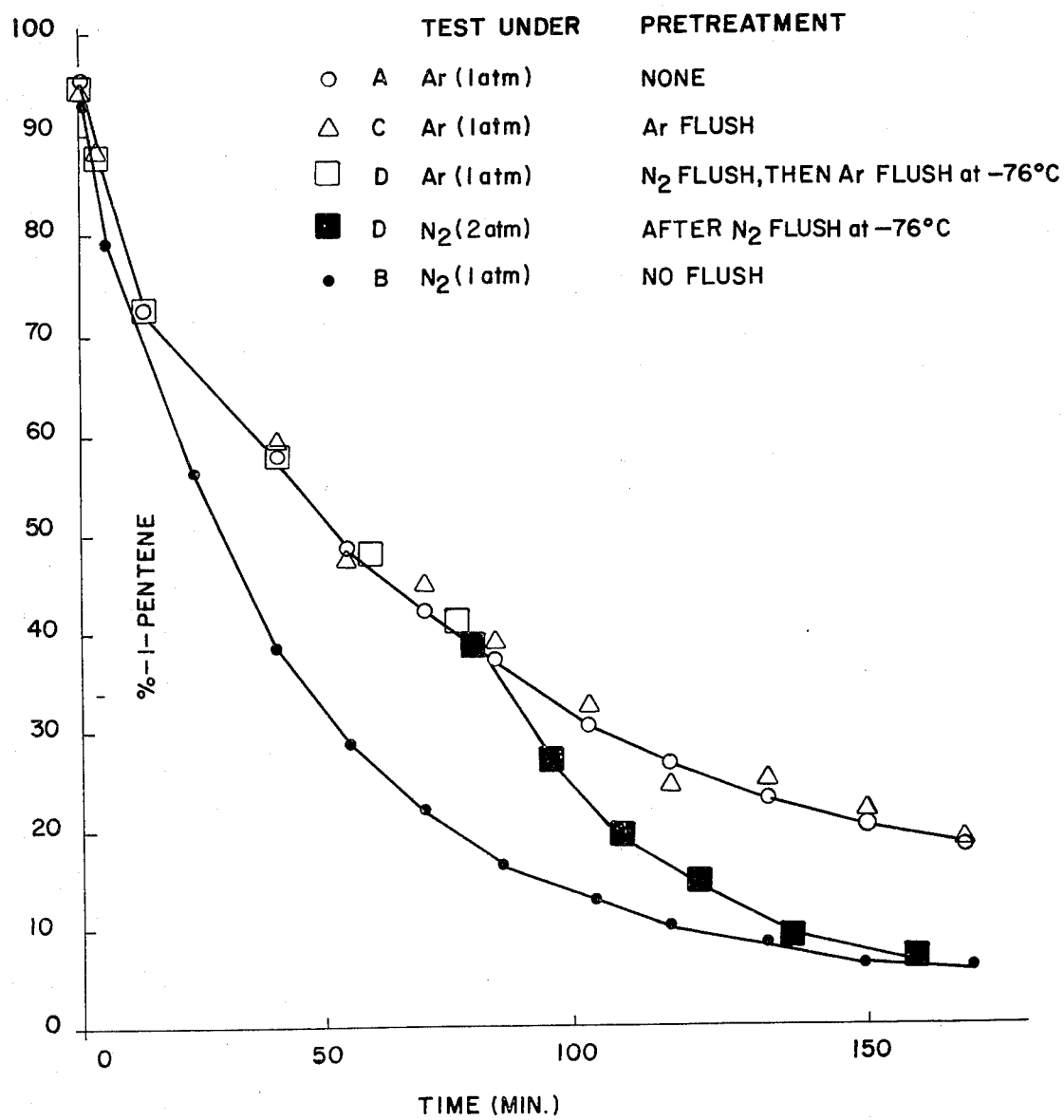

ACYCLIC OLEFIN ISOMERIZATION IN NITROGEN ATMOSPHERE USING COBALT HYDRIDE COMPLEXES

This invention relates to olefin double bond isomerization by contacting an olefin with a cobalt hydride complex containing tertiary phosphine, arsine or stibine ligands.

Various processes for isomerizing olefins are known in the art. In general, prior art processes suffer from one or more limitations such as excessive olefin cracking, undesirable olefin polymerization, excessive randomization or unfavorable economies. The identification of new catalyst systems which are effective isomerization catalysts, particularly where the catalyst systems can be applied selectively in a predictable manner, is of continuing interest and of potential economic benefit to the chemical industry at large.

It is an object of this invention to provide a process for the double bond isomerization of olefins. In addition, it is an object to catalytically isomerize terminal olefins into internal olefins. Another object is to provide a process for the isomerization of straight-chain terminal olefins to straight-chain internal olefins wherein the internal olefin mixtures contain substantially equal amounts of trans and cis isomers.

According to this invention, the double bond of an isomerizable olefin reactant is shifted by contact with a cobalt hydride complex containing tertiary phosphine, arsine or stibine ligands.

The cobalt hydride complex employed in this invention can be represented by the formula

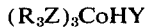

$(R_3Z)_3CoHY$ wherein:

Z is independently selected from phosphorus, arsenic or antimony;

Y is selected from $H_2$, $N_2$ and $NH_3$; and

R is independently selected from hydrocarbyl radicals containing from 1 to 20 carbon atoms including alkyl, aryl, monohalogenated aryl, cycloalkyl radicals and combinations thereof such as alkaryl, aralkyl and alkcycloalkyl radicals.

Examples include: (triphenylphosphine)$_3$CoH$_3$, (triethylphosphine)$_3$CoH(N$_2$), [(4-methylphenyl)$_3$phosphine]$_3$-CoH(NH$_3$), (phenyldimethylphosphine)$_3$-CoH(N$_2$), (diphenylmethylphosphine)$_3$CoH$_3$, (dimethyllaurylarsine)$_3$CoH(NH$_3$), (trimethylarsine)$_3$CoH$_3$, (tribenzylarsine)$_3$CoH(N$_2$), (tricyclohexylarsine)$_3$-CoH(NH$_3$), (trieicosylarsine)$_3$CoH(N$_2$), (Triphenylstibine)$_3$CoH$_3$, [(4-methylcyclohexyl)$_3$phosphine]$_3$-CoH(N$_2$), (tridecylstibine)$_3$CoH(NH$_3$), [(4-fluorophenyl)$_3$phosphine]$_3$-CoH(N$_2$), [(4-chlorophenyl)$_3$-phosphine]$_3$CoH$_3$, (trioctylstibine)$_3$-CoH(N$_2$), (triisobutylstibine)$_3$CoH(NH$_3$), (triphenylphosphine)$_2$-(triphenylarsine)CoH(N$_2$), (triphenylphosphine)$_3$-CoH(N$_2$) and the like and combinations thereof.

The cobalt hydride complexes of this invention can be prepared by any convenient method known in the art. Generally convenient methods are illustrated in *J. Organometal. Chem.* 16 (1969), pages 1–4, *J. Organometal. Chem.* 19 (1969), pages 241–244 and *Inorg. Syn.*, Vol. xii, pages 12–22.

Examples of convenient methods are treating a chilled mixture of cobalt II or III acetylacetonate and a trialkyl- or triarylphosphine dissolved in an organic solvent under a hydrogen atmosphere with a reducing agent such as di-n-butylaluminum hydride and isolating the product. The nitrogen complex is formed by dissolving the product in a solvent such as diethyl ether and bubbling nitrogen through the mixture. The complex is recovered after evaporating the solvent.

In another process, the nitrogen complex is formed directly by treating a mixture of the cobalt acetylacetonate and trialkyl- or triarylphosphine in an organic solvent at room temperature in a nitrogen atmosphere with triisobutylaluminum and isolating the product.

The cobalt dinitrogen and ammonia complexes can be prepared conveniently by the addition of nitrogen or ammonia directly to a (R$_3$Z)$_3$CoH$_3$ complex.

The cobalt complexes employed in this invention are air-sensitive and are generally unstable in the presence of air or oxygen-containing atmospheres. Accordingly, the preparation and use thereof should exclude or appreciably restrict air or oxygen, as well as exclude any reactive substance or atmospheres which tend to reduce the effectiveness of the complex in an isomerization process. Thus, in carrying out an isomerization with the catalysts, an atmosphere such as argon, helium, neon, krypton, nitrogen, etc. or combinations thereof is maintained over the reaction mixture. Pressures ranging from 0.1 atmosphere to 100 atmospheres are operable, more preferably 1–10 atmospheres.

In accordance with one preferred embodiment of the invention, nitrogen is employed in the atmosphere maintained over the reaction mixture, it having been found that nitrogen dramatically enhances activity of the catalysts. Also, isomerization in the presence of nitrogen results in the product mixture containing approximately 50% of each of cis and trans isomers.

In general, the cobalt complexes have limited solubility in commercially important olefin isomerization and hydrogenation process feedstocks. Advantageously, in some cases, therefore, the complex is employed in the presence of substantially inert solvents to facilitate mixing of olefin reactant and cobalt catalyst. Representative inert organic solvents which can be used include aromatic hydrocarbons including benzene, toluene, ortho-xylene, meta-xylene, para-xylene, as well as other inert solvents including tetrahydrofuran and similar solvents.

The cobalt complexes can be employed in catalytic olefin isomerization reactions by depositing the complex on a solid inorganic oxide catalyst support. Such support materials are commonly known as refractory oxides and include synthetic materials as well as acid treated clays or the crystalline aluminosilicates known in the art as molecular sieves. Generally, about 1 to 10 weight percent complex based on the weight of the support is preferred. Suitable supports include silica, alumina, silica-alumina, titania, thoria, zirconia, etc. and combinations thereof. The support is preferably calcined at an elevated temperature, i.e. about 425 to about 650° C. in air and cooled in nitrogen, hydrogen, etc. before admixing with the complex. Impregnation of the support with a solution or slurry of the complex followed by removal of the solvent is the preferred method of preparation, although any conventional method can be employed, such as dry mixing.

Suitable starting materials are isomerizable olefins including acyclic monoenes and acyclic polyenes encompassing conjugated and non-conjugated dienes, trienes, mixtures thereof and the like. The olefins can contain aryl or cycloalkyl substituents or combinations thereof. Preferred olefins, because of their commercial importance, contain from 4 to 20 carbon atoms per molecule and more preferably from 4 to 10 carbon atoms per molecule. Examples of the olefins include: 1-butene, 1-pentene, 1-hexene, 3-hexene, 1-decene, 5-methyl-1-hexene, 7-methyl-1-nonene, 5-ethyl-1-octene, 2-butene, 2-pentene, 4-methyl-2-hexene, 4-phenyl-1-butene, 5-cyclopentyl-1-pentene, 4-phenyl-2-butene, 5-isopropyl-2-heptene, 2-decene; 2,3,4-trimethyl-6-dodecene; 1,3-tetradecadiene, 4-eicosene; 1-(3-butenyl)-4-ethylbenzene; 1-(3-pentenyl)-3-methylcycloheptane; 1,3-octadiene; 1,4,7-decatriene and the like and combinations thereof.

The amount of cobalt hydride complex employed in the isomerization processes can vary widely. Preferably, an amount of complex is used which affords a reasonable amount of isomerization within a reasonable reaction period of time. In general, cobalt hydride complex: olefin weight ratios of from about 0.001 to about 20 parts by weight of complex per 100 parts by weight of olefin are suitable to the practice of this invention.

The isomerization processes can be carried out as either a batch or as a continuous process using any conventional apparatus. Depending on the mode of reaction and other conditions such as reaction temperature and complex: olefin weight ratio, contact time can vary from 1 minute to 100 hours, at any convenient pressure, ranging from subatmospheric to about 2000 psig and more preferably from about 0 to 2000 psig.

The isomerization reaction temperatures can vary widely. In general, the reaction temperature should be such that the reactants and cobalt complex composites are stable and do not decompose into undesirable by-products or inactive complex composites. Thus, the isomerization process is generally carried out at a temperature in the range of from about $-20°$ C. to about $70°$ C. and preferably at a temperature in the range of about $0°$ C. to about $50°$ C. Ordinarily, the temperature should not exceed about $80°$ C., at which temperature decomposition of the complex can begin.

The reaction products of this invention can be separated from the reaction mixtures by any method known in the art. Suitable separation techniques include filtration, distillation, decantation, adsorption and the like.

The following examples are given to illustrate the processes of this invention and are not intended to unduly limit the scope of the present invention in strict accordance therewith.

EXAMPLE I 0.22 gram of (triphenylphosphine)$_3$CoH(N$_2$) was dissolved in 40 milliliters of toluene under an argon atmosphere in a glove box. The solution was divided into equal parts, each part was placed in a 30 milliliter Diels-Alder tube and the tubes were sealed with neoprene caps. One tube A was placed in a bath held at $25°$ C. and 2 milliliters (about 1.3 grams) of 1-pentene was added to the solution with vigorous stirring. A stream of nitrogen was passed through the solution in the other tube B for 2 hours while the solution was being stirred. That tube was left overnight in the dark under 14 psig nitrogen. The tube was then placed in a bath held at $25°$ C. and 2 milliliters of 1-pentene were added to the solution with vigorous stirring. Periodically, 10 microliter samples were removed from each tube and analyzed by gas-liquid chromatography. The following results were obtained:

Table I

| Time (min.) | Tube A (Under Argon) Mole % | | | Tube B (Under Nitrogen) Mole % | | |
|---|---|---|---|---|---|---|
| | 1-Pentene | Trans-2 Pentene | Cis-2 Pentene | 1-Pentene | Trans-2 Pentene | Cis-2 Pentene |
| 0 | 100 | 0 | 0 | 100 | 0 | 0 |
| 1.5 | 86 | 8 | 6 | 87 | 6 | 6 |
| 7 | 77 | 9 | 14 | 70 | 13 | 17 |
| 22 | 60 | 11 | 29 | 42 | 25 | 33 |
| 38 | 49 | 12 | 39 | 26 | 32 | 42 |
| 54 | 40 | 14 | 46 | 17 | 36 | 48 |
| 70 | 33 | 16 | 51 | 12 | 39 | 49 |
| 90 | 28 | 16 | 56 | 8 | 41 | 51 |
| 106 | — | — | — | 6 | 43 | 50 |
| 107 | 23 | 18 | 58 | — | — | — |
| 126 | 20 | 19 | 61 | 5 | 45 | 50 |
| 150 | 16 | 20 | 63 | 4.2 | 45 | 50 |
| 181 | 13 | 22 | 65 | — | — | — |
| 183 | — | — | — | 3.8 | 47 | 48 |

In both cases 0.5 mole percent pentane is also formed. The above data show that isomerization proceeds more rapidly under a nitrogen atmosphere than under an argon atmosphere. For example, in Tube B, 84% conversion is obtained in 54 minutes whereas in Tube A, it requires 150 minutes to obtain 83% conversion. The data also show that a predominantly cis isomer is obtained after about 90 minutes or longer when an argon atmosphere is used whereas in a nitrogen atmosphere the cis and trans isomers are present in more equal amounts.

EXAMPLE II 0.4 gram of (triphenylphosphine)$_3$CoHN$_2$ was dissolved in 80 milliliters of toluene in a glove box under argon free of oxygen or moisture. The solution was divided into four equal parts. Each 20 milliliter portion was placed in a Diels-Alder tube equipped with a magnetic stirrer. The tubes were sealed with neoprene seals and removed from the glove box.

The isomerization tests were carried out at $25°$ C. ± 0.2 at atmospheric pressure unless otherwise specified. 2 milliliters of pentene-1 were added to each tube as indicated below. 10 microliters were removed at regular intervals and analyzed by gas-liquid chromatography on a 20 foot bio-ether column.

Tube A — The pentene was added without any pretreatment.

Tube B — The solution was flushed with N$_2$ for 1 hour and the pentene was added to the solution under 1 atm. of N$_2$.

Tube C — The solution was flushed with argon for 1 hour and the pentene was added to the solution under 1 atm. of argon.

Tube D — The solution was flushed with $N_2$ for 80 minutes to bring about the same changes that might occur in Test B. The solution was then cooled to −76° C. and the nitrogen purged from the system by flushing with argon for 90 minutes. The temperature was raised to 25° C., the pentene was added to the solution under 1 atm. of argon and the reaction was allowed to proceed.

Tube D, Part 2 — After the reaction had proceeded for 80 minutes the solution was cooled to −76° C. to stop the reaction and was flushed with $N_2$ for 20 minutes. It was then charged with two atmospheres of $N_2$ and brought back to 25° C. and the reaction allowed to proceed.

The results of these tests are summarized in FIG. 1 from which it is clear that the reaction proceeds at the same rate in an argon atmosphere regardless of the pretreatment of the solution (tests A, C and D), and that the reaction proceeds much more rapidly under $N_2$.

The half times, t½, i.e., the times needed for half of the pentene-1 to be isomerized (obtained from FIG. 1) are 27.5 minutes under 1 atmosphere of $N_2$ and 53.5 minutes under 1 atmosphere of Ar. Thus, the reaction rate is almost exactly twice as fast under $N_2$ than under Ar.

Comparison of the results obtained in Test B under 1 atmosphere of $N_2$ with those obtained in Test D (part 2) under 2 atmospheres of $N_2$ shows that the reaction is further increased by increasing the pressure (concentration) of $N_2$. Thus, to reduce the pentene-1 concentration from 39.5 to 10%, 93 minutes are needed under 1 atmosphere of $N_2$ and only 65 minutes under 2 atmospheres.

Those modifications and equivalents which fall within the spirit of the invention are to be considered a part thereof.

What is claimed is:

1. An isomerization process which comprises contacting under suitable isomerization conditions and in the presence of molecular nitrogen an acyclic olefin reactant with a cobalt hydride complex represented by the formula $$(R_3Z)_3CoHY$$

wherein

Z is independently selected from phosphorus, arsenic or antimony;

Y is selected from $H_2$, $N_2$ and $NH_3$; and

R is independently selected from hydrocarbyl radicals containing from 1 to 20 carbon atoms including alkyl, aryl, monohalogenated aryl, cycloalkyl radicals and combinations thereof, and recovering substantially equal amounts of cis and trans olefin isomers.

2. A process in accordance with claim 1 wherein the contacting is carried out under pressure within the range of about 0 to about 2000 psig and a temperature within the range of about −20° C. to about 70° C. and said contacting period is in the range of about 1 minute to about 100 hours.

3. A process in accordance with claim 1 wherein the contacting is carried out over a heterogeneous catalyst of said cobalt hydride complex supported on a solid inorganic oxide.

4. A process in accordance with claim 1 wherein Y is nitrogen.

5. A process in accordance with claim 1 wherein Y is hydrogen.

6. A process in accordance with claim 1 wherein Y is ammonia.

7. A process in accordance with claim 1 wherein said R is alkyl, cycloalkyl, aryl hydrocarbyl radicals or combinations thereof.

* * * * *